United States Patent
Terradas Prat

(10) Patent No.: US 8,757,025 B2
(45) Date of Patent: Jun. 24, 2014

(54) SHIFT MODULE

(75) Inventor: Jaume Terradas Prat, Barcelona (ES)

(73) Assignee: Fico Cables, S.A., Mollet del Valles (ES)

( * ) Notice: Subject to any disclaimer, the term of this patent is extended or adjusted under 35 U.S.C. 154(b) by 981 days.

(21) Appl. No.: 12/095,425

(22) PCT Filed: Dec. 6, 2006

(86) PCT No.: PCT/EP2006/011713
§ 371 (c)(1),
(2), (4) Date: Jun. 2, 2008

(87) PCT Pub. No.: WO2007/065656
PCT Pub. Date: Jun. 14, 2007

(65) Prior Publication Data
US 2008/0295632 A1 Dec. 4, 2008

(30) Foreign Application Priority Data
Dec. 6, 2005 (DE) .......................... 10 2005 058 244

(51) Int. Cl.
G05G 5/00 (2006.01)
F16H 59/04 (2006.01)

(52) U.S. Cl.
USPC ...................................... 74/473.28; 74/473.3

(58) Field of Classification Search
USPC ................. 74/473.1, 473.12, 473.24, 473.25, 74/473.26, 473.28, 473.3, 473.36
See application file for complete search history.

(56) References Cited

U.S. PATENT DOCUMENTS 4,912,997 A * 4/1990 Malcolm et al. ................ 74/335
6,000,296 A * 12/1999 Sundquist .................. 74/473.12
(Continued)

FOREIGN PATENT DOCUMENTS

EP 0620385 * 10/1994 ............. F16H 59/04
EP 0620385 B1 2/1998
(Continued)

OTHER PUBLICATIONS

"threshold, n.". OED Online. Jun. 2011. Oxford University Press. Sep. 6, 2011 <http://oed.com/view/Entry/201234?rskey=VYjPd9&result=1&isAdvanced=false>.*

Primary Examiner — Justin Krause
Assistant Examiner — Gregory Prather
(74) Attorney, Agent, or Firm — John D. Titus

(57) ABSTRACT

The present invention relates to a shift module 1 for a shift lever of an automatic gear drive, comprising a linearly displaceably supported slider 10, 200, which is engageable with a shift lever and which can be displaced out of its rest position to two opposite switching directions by means of the shift lever, a measuring device 20, 92, 94 connected to the slider 10, 200 for determining of the position of the slider 10, 200, wherein the measuring device 20, 92, 94 is formed such that it can measure the actual position of the slider 10, 200 continuously over its total way of displacement. The shift module 1 further comprises at least one resetting element 30, 230, 232, which is displaceably supported essentially perpendicularly to the slider 10, 200 and which is biased against at least one guiding face 12, 212, 214 that is inclined with respect to the slider 10, 200, such that a resetting force is actuated to the slider 10, 200 over its complete way of displacement in direction to its rest position, wherein the resetting force is alone sufficient to move the slider 10, 200 and the shift lever from each arbitrary position back to the rest position.

15 Claims, 9 Drawing Sheets

(56) References Cited

U.S. PATENT DOCUMENTS

Figure 1:
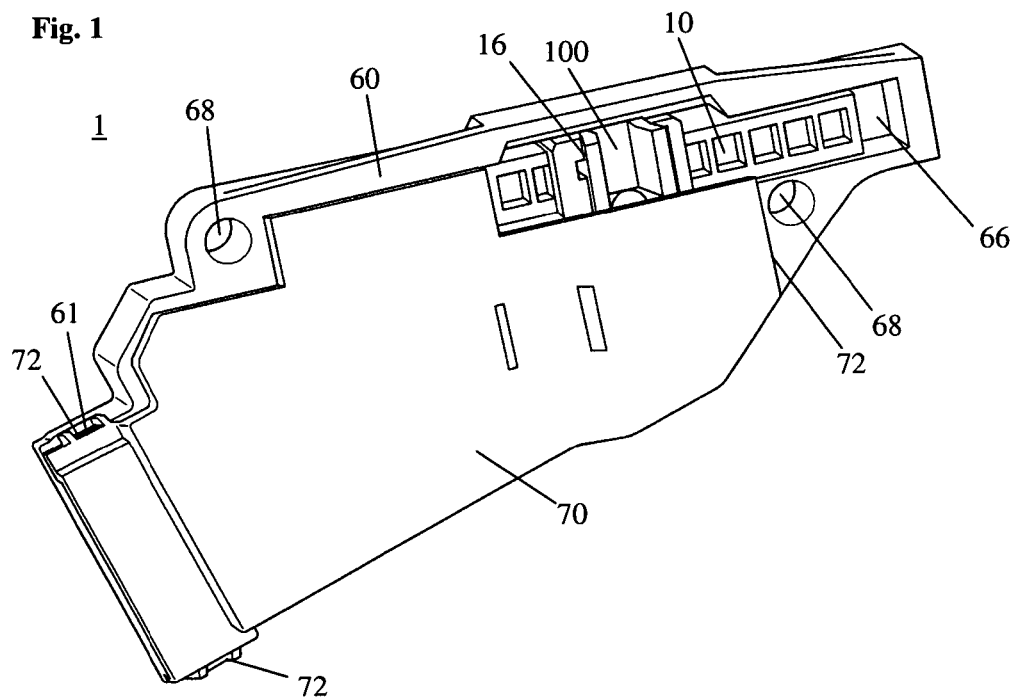

| | | | |
|---|---|---|---|
| 6,209,408 B1 * | 4/2001 | DeJonge et al. | 74/335 |
| 6,766,706 B2 * | 7/2004 | Easton et al. | 74/335 |
| 6,851,538 B2 * | 2/2005 | Meyer et al. | 192/219.4 |
| 6,923,083 B2 * | 8/2005 | Fujinuma | 74/473.33 |
| 2003/0213327 A1 | 11/2003 | Syamoto | |
| 2005/0172746 A1 | 8/2005 | Waldow et al. | |

FOREIGN PATENT DOCUMENTS

| | | |
|---|---|---|
| EP | 0 846 897 A1 | 6/1998 |
| JP | 58167923 | 11/1983 |
| JP | 1-144554 | 10/1989 |
| JP | 6-6813 | 1/1994 |
| JP | 2003-100380 | 4/2003 |
| JP | 3003-327001 | 11/2003 |

* cited by examiner a)

b)

SHIFT MODULE

CROSS-REFERENCE TO RELATED APPLICATIONS

This application claims priority of international application no. PCT/EP2006/011713 filed Dec. 6, 2006, which claims priority of German patent application DE 10 2005 058 244.3 filed Dec. 6, 2005.

FIELD OF THE INVENTION

The invention relates to a shift module for a shift lever of an automatic gear drive, which is suitable to indicate the shift positions of a shift lever particularly for the manual shift mode.

PRIOR ART

In modern automatic gear drives in addition to the normal automatic modes, also a mode is possible at which the driver can change a gear up, respectively down by tipping (moving) the shift lever. In this shift mode usually a higher gear is chosen by tipping the shift lever to the front (in driving direction) and by tipping the shift lever to the back a lower gear. After the tipping of the shift lever to the front, respectively to the back, the shift lever usually automatically is set back to its middle position, respectively rest position.

For detecting and indicating of the shift positions, switches or shift modules are used, which are connected with the shift lever and usually provide electric signals to the gear drive control. Besides this, shift modules serve for setting back of the shift lever to its rest position after the tipping.

In the EP 0 846 897 A1 a shift module is shown, in which the shift lever in both shift directions actuates a spring loaded tappet during the shifting, respectively, which activates a micro switch. During the shifting process the spring of the respective tappet is biased and after the shifting process the shift lever is automatically set back to its rest position due to the pressure sure of the spring. This construction is costly in manufacturing and comprises a plurality of mechanical components due to the two tappets, two springs and two micro switches.

In the EP 1 036 959 A1 a shift module is shown, which comprises a slider, which is held in its middle position by opposite acting springs. In the manual shift mode the shift lever engages the slider to displace it, if desired, in one of the two shift directions. The slider further comprises an indentation, into which a spring loaded stopper engages, to exactly define the middle position of the slider and thereby the middle position of the shift lever. During the switching process a sufficient force has to be introduced to the shift lever, such that the stop member can leave the indentation. If the shift lever is released in one of the two shift positions the slider is moved back to its neutral position by means of one of the return springs. Thereby the stop member again engages the indentation at the neutral position, to exactly define the neutral position. The EP 1 036 959 A1 therefore shows a slider with an indentation which solely acts for preventing an undesired movement of the slider from its neutral position and not to move the slider back to its neutral position. For this additionally two return springs are necessary.

A similar constructive arrangement of a shift module having a slider and a stop member is shown in the DE 10 2004 006 150 B3. Here, a pressure point at the neutral position of the shift lever and a force-dispacement-characteristics is realized by means of a roller guide and the stop member. However, additionally to return springs are arranged at the corresponding ends of the slider, which move the slider and the shift lever back to the middle position.

Further, in the above mentioned shift modules the shifting behavior is permanently predetermined due to the construction. The required shift ways, shift forces and the feeling during the shifting, particularly a haptic feedback for a successful change of gears is not adjustable over the total way of shifting or definable. Additionally, the above mentioned shift modules are costly in construction and susceptible for wear off due to the use of return springs and stop members or the like.

It is therefore the problem of the present invention to provide a shift module for a shift lever of an automatic gear drive, which is easier to manufacture, which comprises less components and which is therefore more cost efficient. Further, by the invention a shift module should be provided, at which the shift ways, shift forces and the shift feeling can be exactly defined and adjusted. Particularly, the shift points of the shift module should be adjustable. Additionally, the shift module should work more reliable and the shift feeling should possibly remain constant over the total lifetime of the vehicle.

SUMMARY OF THE INVENTION

The above mentioned problems are solved by a shift module according to patent claim 1 or patent claim 3.

Particularly the above mentioned problems are solved by a shift module for a shift lever of an automatic gear drive, comprising a linearly displaceably supported slider, which is engageable with a shift lever and which can be displaced out of its rest position into two opposite switching directions by means of the shift lever, a measuring device connected to the slider for determining of the position of the slider, wherein the measuring device is formed such that it can measure the actual position of the slider continuously over its total way of displacement.

With the measuring device according to the invention it is possible to continuously measure the actual position of the slider over the total way of displacement, such that it is possible to set arbitrary switching position of the shift lever. Therefore, the definition of the switch points is done in an electronic way and is not predetermined by mechanical conditions like it is the case in the prior art. Particularly, the switching points can be associated to arbitrary displacement positions of the slider. Thereby it is possible to exactly define the shift ways, and the shift feeling for shifting up or shifting down of the gear drive.

In a preferred embodiment the shift module further comprises at least one resetting element, which is displaceably supported essentially perpendicularly to the slider and which is biased against at least one guiding face that is inclined with respect to the slider, such that a resetting force is actuated to the slider over its complete way of displacement in direction to its rest position, wherein the resetting force is alone sufficient to move the slider and the shift lever from each arbitrary position back to the rest position.

The above mentioned problems are also solved by a shift module for a shift lever of an automatic gear drive, comprising a linearly displaceably supported slider, which is engageable with a shift lever and which can be displaced by the shift lever from a rest position to two opposite shift directions, a measuring device associated to the slider for detecting the shift positions of the slider, at least one resetting element, which is displaceably supported essentially perpendicularly to the slider and which is biased against at least one guiding face that is inclined with respect to the slider, such that a resetting force is actuated to the slider over its complete way of displacement in direction to its rest position, wherein the resetting force is alone sufficient to move the slider and the shift lever from each arbitrary position back to the rest position.

By the combination of resetting element and inclined guiding face, which is formed such that it is able to adjust the slider in direction to its rest position over the complete way of displacement, a simple, secure and exact possibility is provided to determine the shift feeling respectively the actuation feeling of the shift lever of an automatic gear drive. By the shape and inclination of the guiding face a haptic feedback of the shift process can be given to the user. Simultaneously, the slider and therefore the shift lever is automatically set back to its rest position by means of the guiding face, without the need to provide additional resetting springs or the like.

The function of the haptic feedback and the resetting of the shift lever are combined with each other and are integrated by means of slider and biased resetting element. In this manner the shift module essentially comprises only two moveable parts (slider and resetting element) and is therefore particularly wear-resistant, reliable and secure.

In a first preferred embodiment, the resetting element is a spring biased tappet that is supported in a housing. A tappet, which is displaceably supported in a housing, provides a particularly simple possibility to provide a resetting element, which is perpendicularly arranged to the slider.

Preferably, the guiding face is arranged at the slider and comprises an effective width, which is larger than the maximum way of displacement of the tappet. Therefore, it is guaranteed that the tappet any time presses against an inclined guiding face to actuate a resetting force to the slider, to securely move it back to its rest position.

In a further preferred embodiment the guiding face comprises two essentially symmetrical partial faces, which are shaped convex in direction of the resetting element and which define a rest position in between them. By this particular shape a shift feeling is provided, by which the shift lever has to be displaced by means of a comparably high force out of the rest position and wherein this force decreases in direction to the end positions after exceeding a maximum, such that a haptic feedback of the shift function is provided. Then, the shift feeling approximately corresponds to the latching of a gear at an usual manual gear drive.

In a further preferred embodiment the tappet comprises a rotatably supported roller, at the end facing the slider. By means of this roller the friction between the tappet and the slider decreases. Thereby, the desired characteristic shift feeling can be adjusted more exactly and the wear-off is lower.

Preferably, the tappet is supported within a metal guide, which preferably is produced of powder metallic material. The metal guide in combination with the tappet preferably made of plastic material, enables a very exact and friction-free support of the tappet. Therefore, the wear-off is further decreased and the shift feeling is improved. Between the powder metallurgically produced material and the tappet, preferably consisting of a plastic material, a very frictionless bearing is enabled, having an almost constant friction behavior over the complete lifetime of the shift module.

In a further preferred embodiment the resetting element is a spring biased roller, which is supported in the slider. By integrating the roller directly into the slider a particularly small shift module can be provided.

Preferably, the guiding face is formed into a housing of the shift module. Further, it is preferred that the roller is spring biased by means of a spring via a wedge element. The wedge element transmits the force of the spring to the roller, such that it can be biased against the guiding face perpendicularly to the direction of movement of the slider.

In a preferred embodiment two rollers, which are biased by means of a common spring are arranged within the slider as resetting elements. By using two rollers as resetting elements the resetting functions can be separated for both directions of movement. Thereby, higher and more precisely metered resetting forces can be achieved.

In a further preferred embodiment the shift module further comprises a housing and a circuit board, which is play-free supported within the housing by means of O-rings. The O-rings on the one hand serve as a damping material and on the other hand they equalize tolerances of the housing, such that the circuit board is supported without play and vibration protected within the housing of the shift module.

In a further preferred embodiment the measuring device comprises a permanent magnet, which is connected to the slider and which cooperates with two stationary Hall sensors. By the use of a permanent magnet and at least two Hall sensors a particularly secure determination of the position of the slider is possible, since moveable contacts or the like can be eliminated. Further, Hall sensors are preferred over optical sensors, since they are less sensitive with respect to dust, plastic wear debris or lubricants. Such a measuring device thereof must not be costly protected against dust or fats.

Further, the Hall sensors cannot solely be used as switches, but can determine the actual strength of the magnet field subjected to them. Therefore, they can be used together with a moveably arranged magnet as a positioning measuring means, by means of which the actual position between the magnet and the Hall sensor can be measured.

In a preferred embodiment both Hall sensors are stimulated by the permanent magnet essentially with the same force in the rest position of the slider. This means, that the permanent magnet is geometrically arranged such that the magnet field acting on the Hall sensors in the rest position is almost equal. In this condition the Hall sensors detect the rest position of the shift lever.

In a preferred embodiment the shift module further comprise a shift electronics, which outputs a digital shift signal to the automatic gear drive at particular values measured by the Hall sensors. By means of the measuring device a digital shift signal is calculated out of the exact position of the slider, if the position of the slider reaches a particular shift position.

Preferably the shift electronics is arranged such that particular thresholds are adjustable, at which a corresponding shift signal is output to adjust the desired shift position of the slider. By the pure electronic positioning detection of the slider and thereby of the shift lever, together with the magnetic positioning detection, the shift electronics can be set to desired shift positions of the slider. So, it is for example possible to set the shift module to different shift characteristics (for example comfortably or sportive) or to particular requirements of the driver (short shift way, long shift way).

In a further embodiment the shift electronics is arranged such that the velocity of the slider and thereby the velocity of the shift lever can be measured. From the velocity by which the driver moves the shift lever, information can be derived in which traffic situation the driver is (starting, accelerating, passing, rolling out in front of a traffic light, etc.). Thereupon the motor control or the gear drive control can be correspondingly adapted.

The further preferred embodiments relate from the dependent claims.

SHORT DESCRIPTION OF THE DRAWINGS

Figure 2:
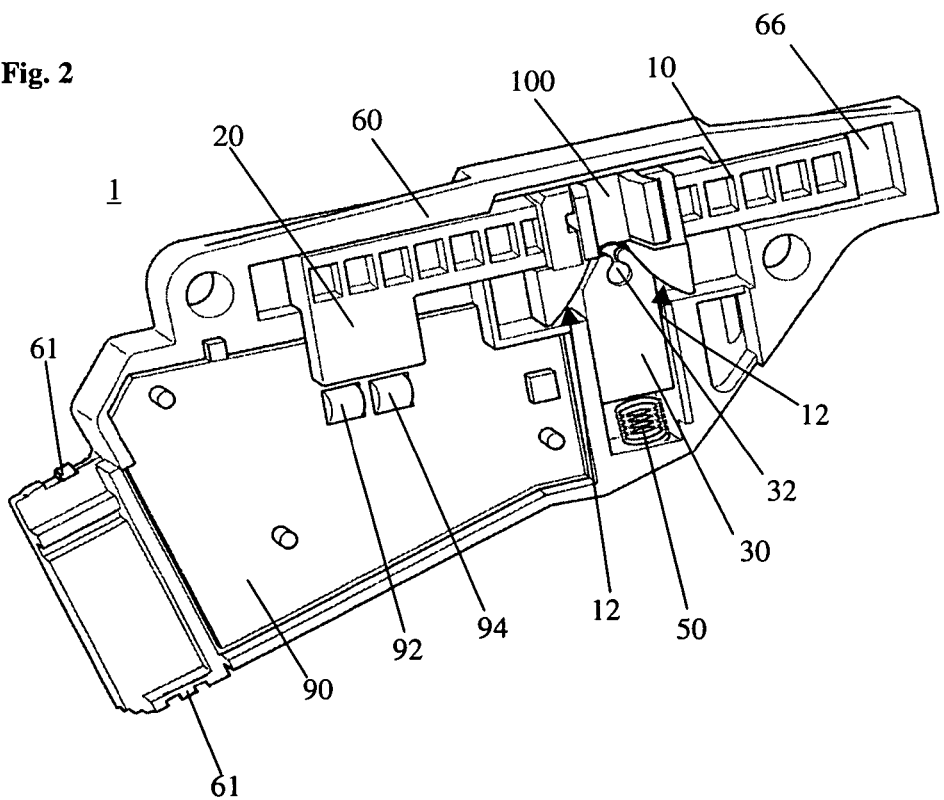
Figure 3:
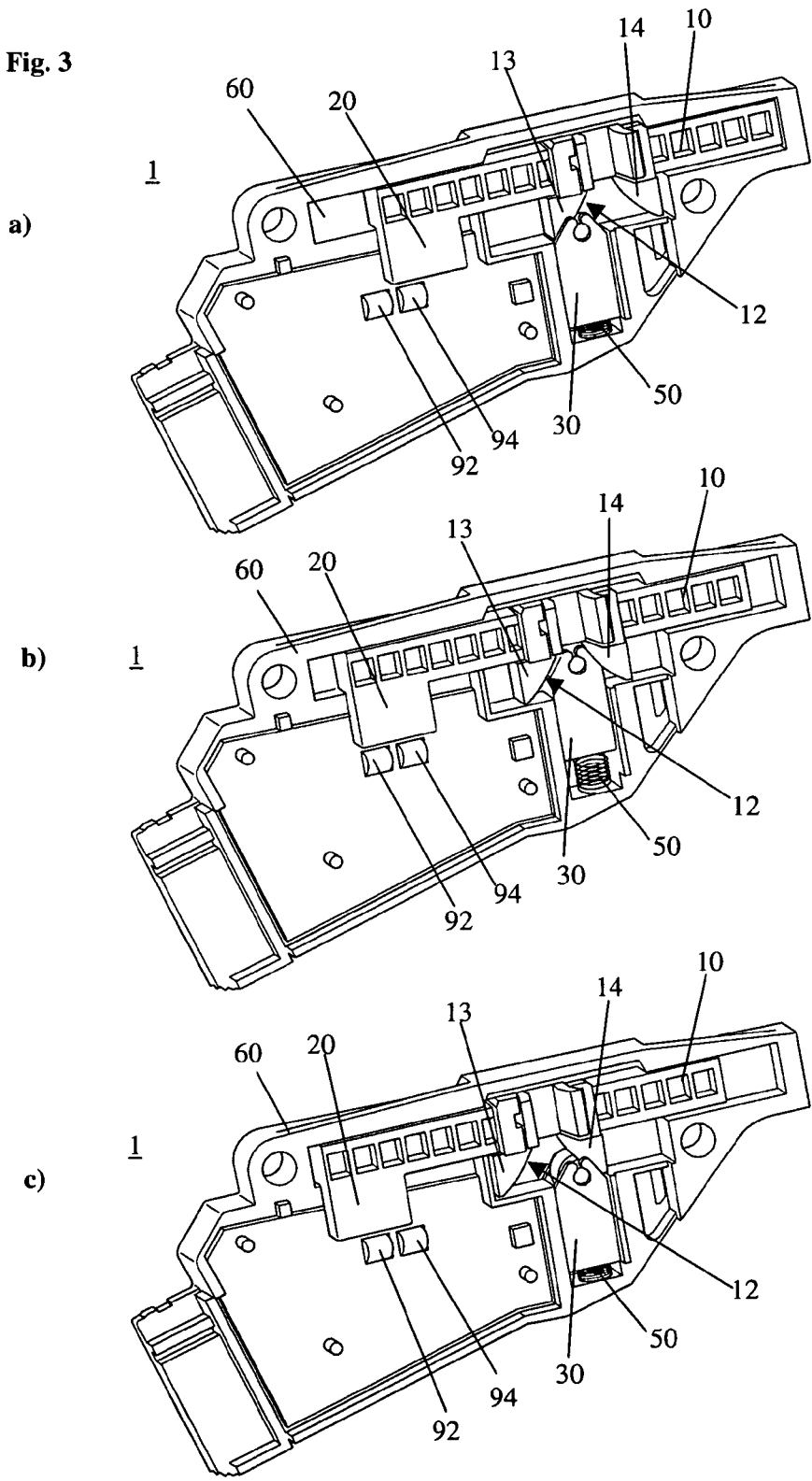
Figure 4:
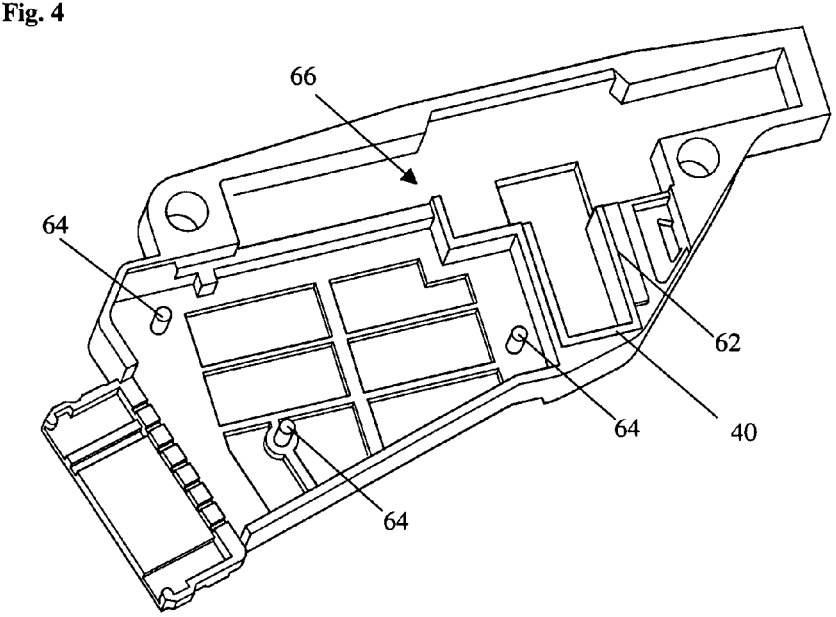
Figure 5:
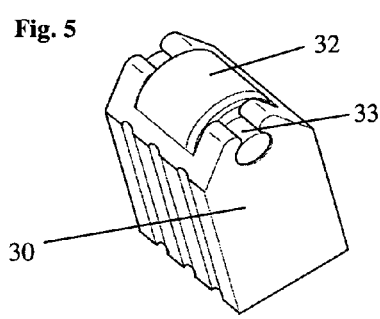
Figure 6:
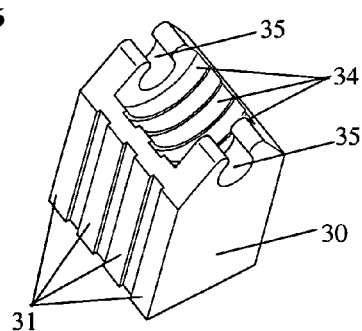
Figure 7:
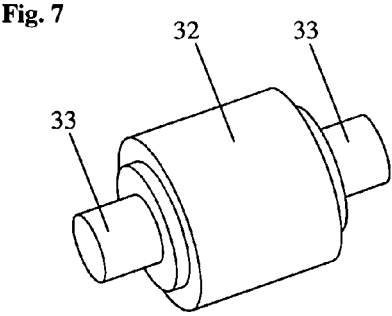
Figure 8:
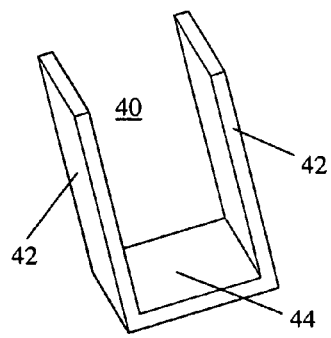
Figure 9:
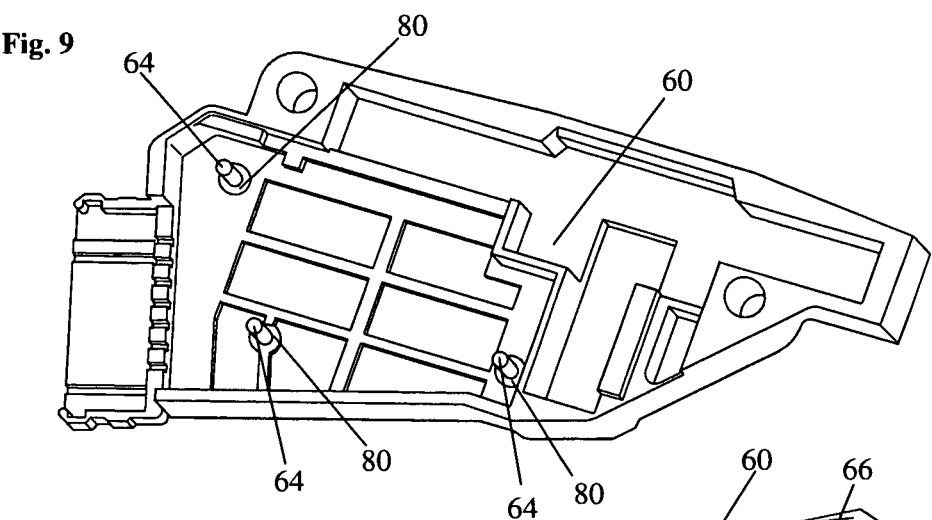
Figure 10:
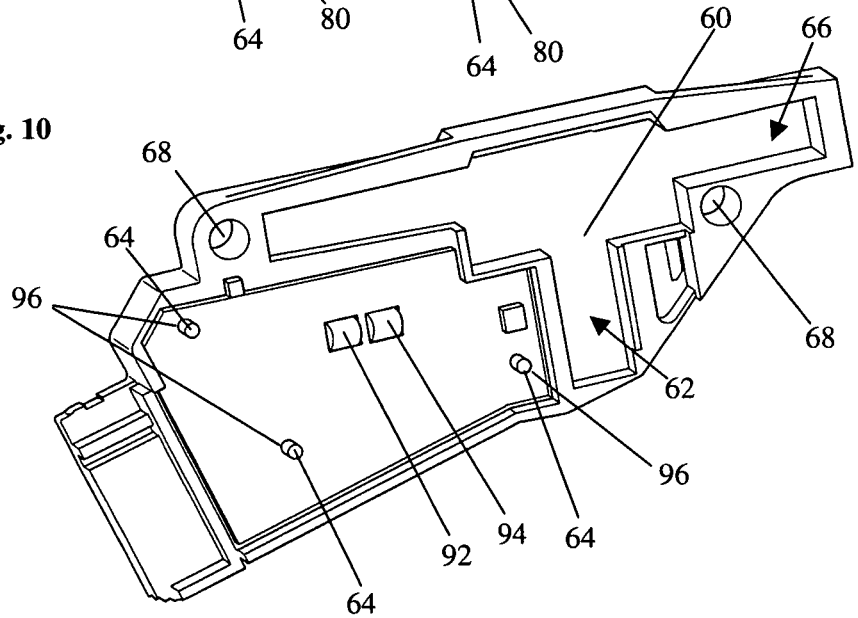
Figure 11:
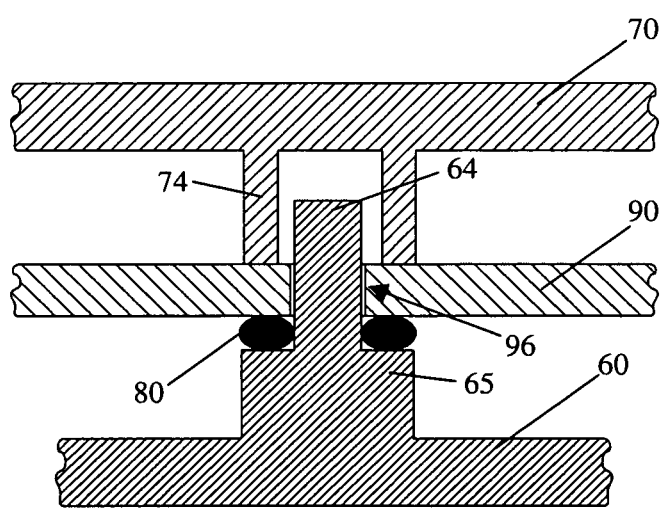
Figure 12:
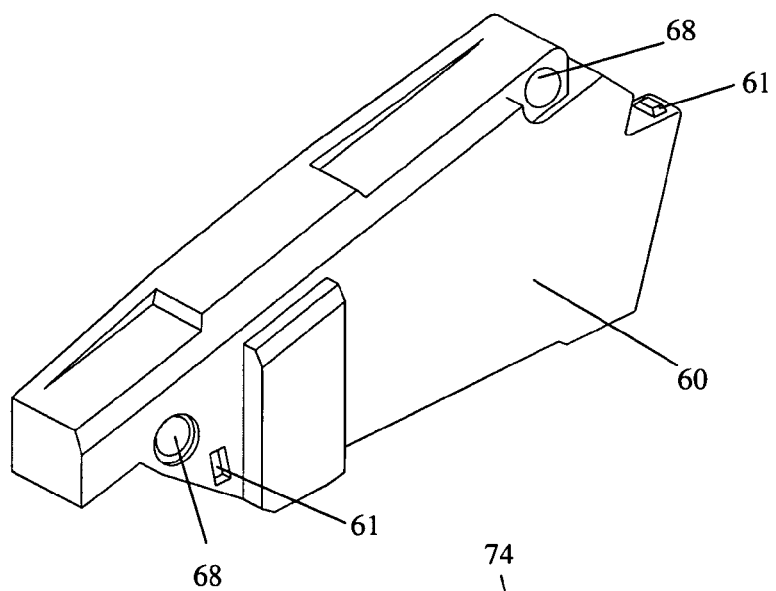
Figure 13:
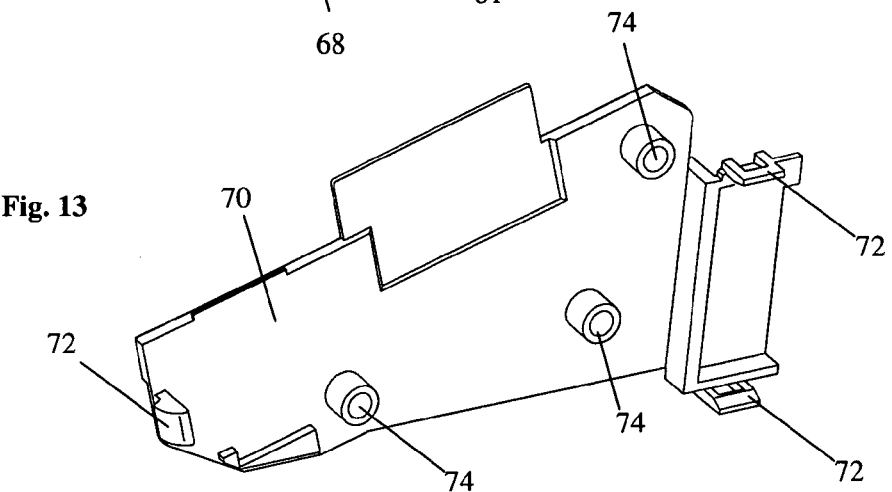
Figure 14:
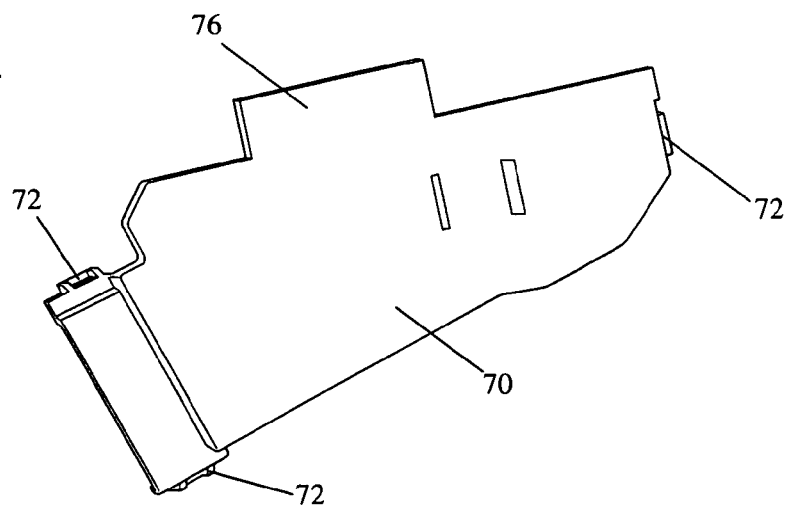
Figure 15:
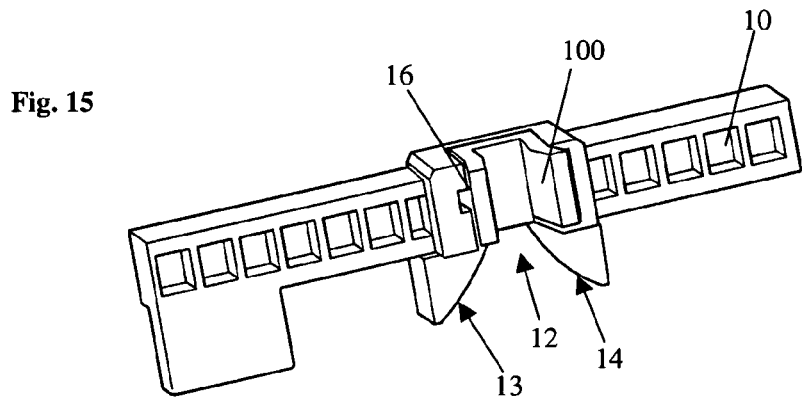
Figure 16:
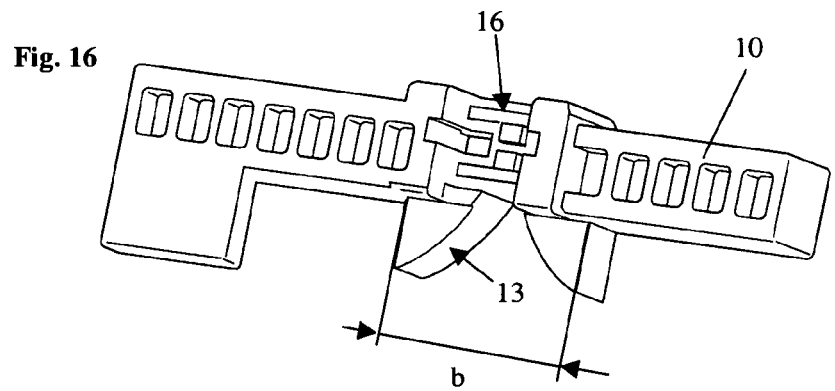
Figure 17:
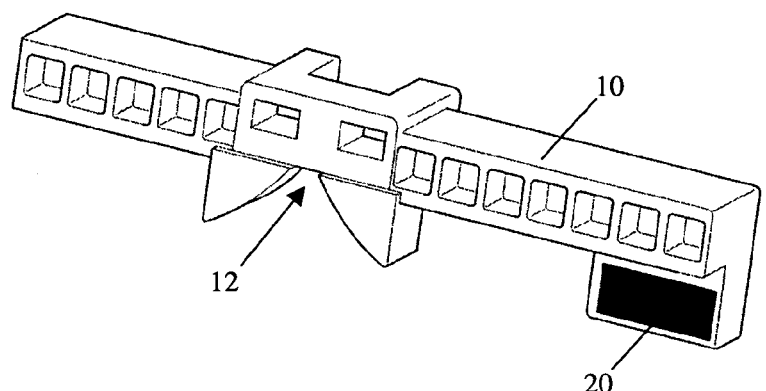
Figure 18:
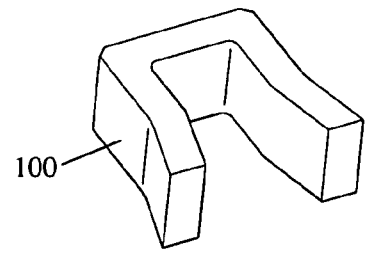
Figure 19:
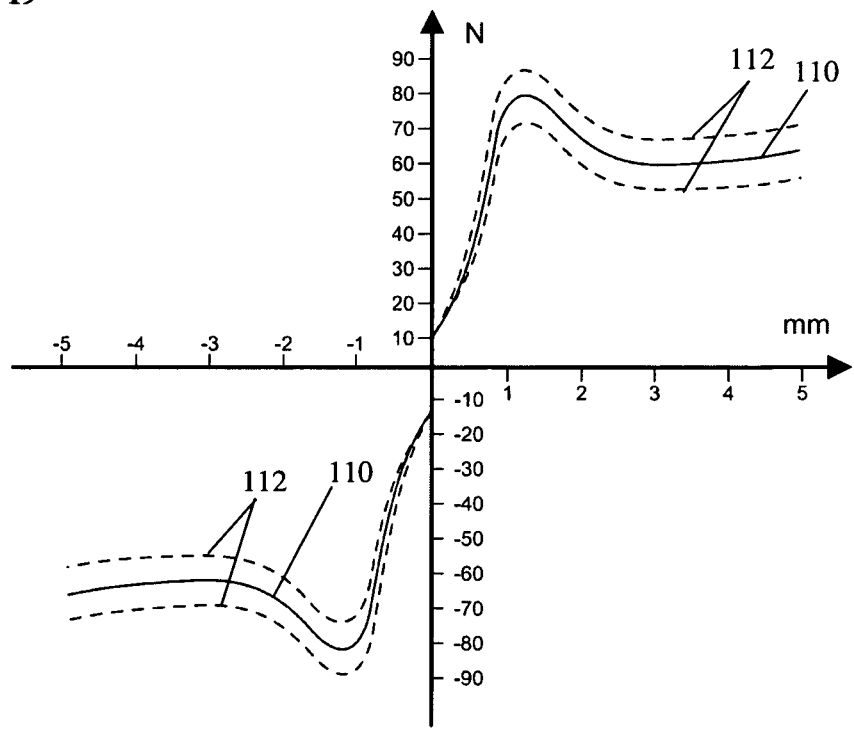
Figure 20:
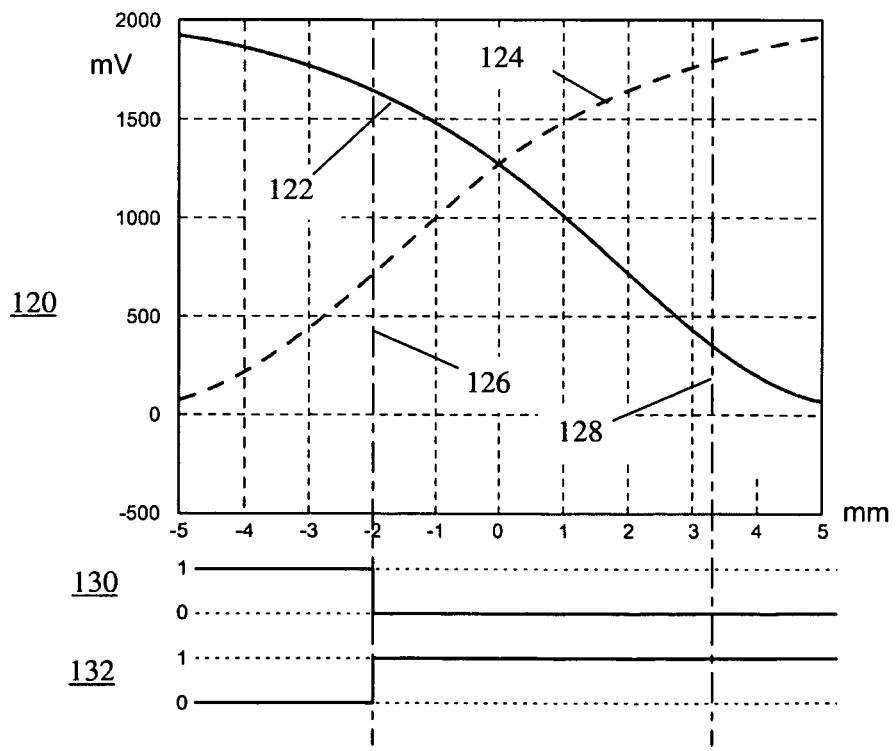
Figure 21:
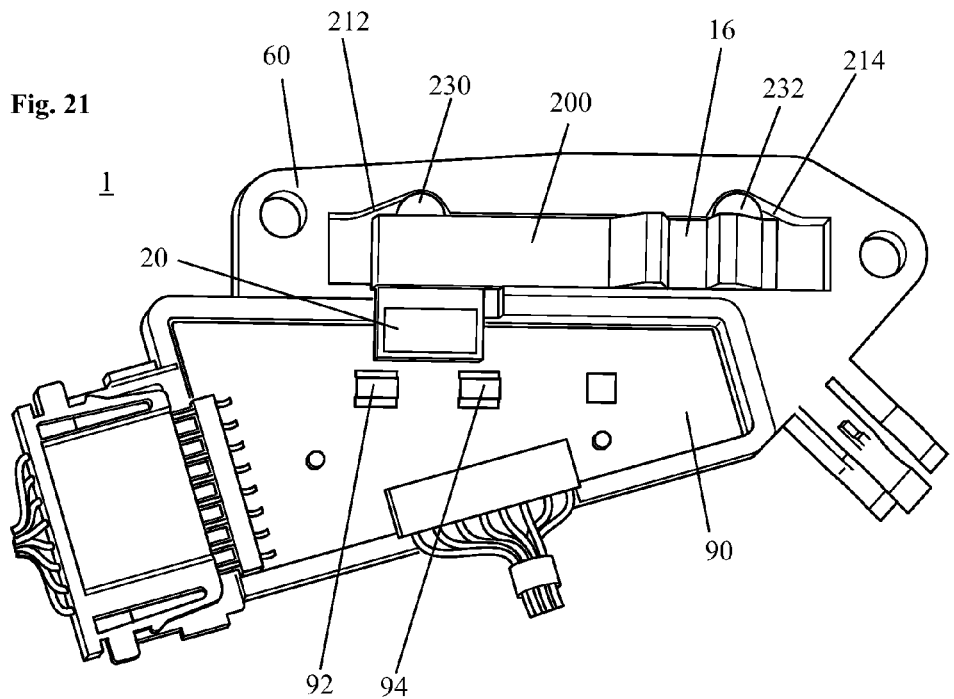
Figure 22:
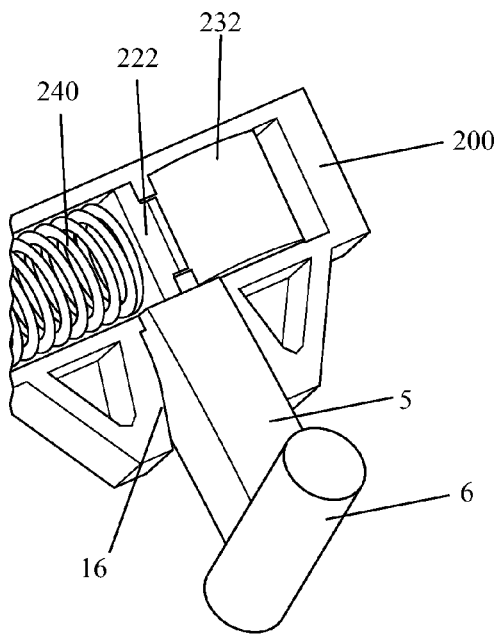
Figure 23:
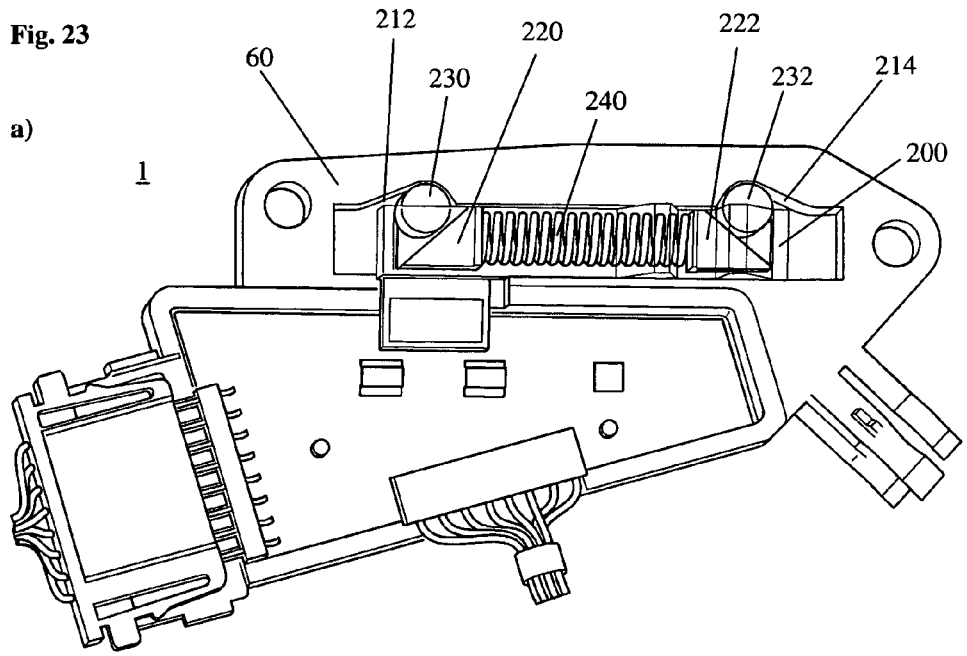
Figure 23:
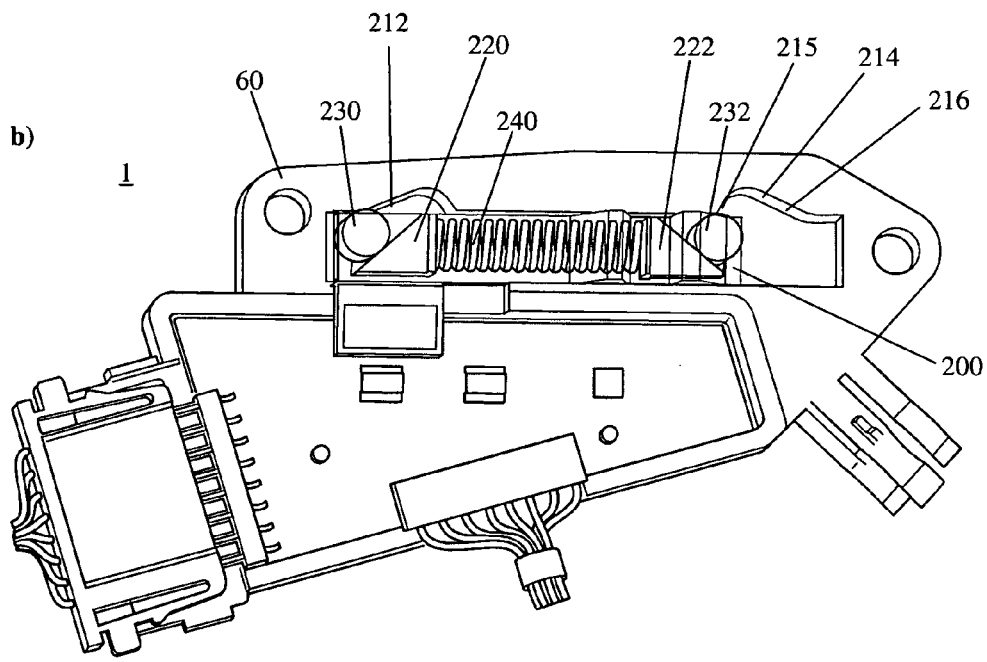

In the following preferred embodiments of the invention are described with reference to the drawings. Therein it shows:

FIG. 1: a three-dimensional view of a shift module according to the invention in assembled condition;

FIG. 2: a three-dimensional view of a shift module of FIG. 1, wherein the housing lid is eliminated to show the inner components;

FIG. 3: a sequence of three shift positions a, b, c of the shift module of FIG. 2;

FIG. 4: a three-dimensional view of a housing with a metal guide for supporting of a tappet;

FIG. 5: a three-dimensional view of a tappet having a roller;

FIG. 6: a three-dimensional view of a tappet without mounted roller;

FIG. 7: a three-dimensional view of a roller of a tappet;

FIG. 8: a three-dimensional view of the metal guide of FIG. 4;

FIG. 9: a three-dimensional view of a housing with mounting pins and O-rings mounted thereon;

FIG. 10: a three-dimensional view of a housing with mounting pins and a circuit board mounted thereon;

FIG. 11: an increased sectional view through the shift module of FIG. 1 in the area of mounting pins for mounting of a circuit board;

FIG. 12: a three-dimensional view of a housing from the backside;

FIG. 13: a three-dimensional view of the housing lid from the under side with mounting elements;

FIG. 14: a three-dimensional view of the housing lid of FIG. 13 from the top side;

FIG. 15: a three-dimensional view of a slider with an integrated insert;

FIG. 16: a three-dimensional view of a slider of FIG. 15 without insert;

FIG. 17: a three-dimensional view of the slider of FIG. 15 from the backside with inserted magnet;

FIG. 18: a three-dimensional view of an insert;

FIG. 19: a diagram which shows the force progression at the slider over the way of displacement;

FIG. 20: a diagram which shows the voltages outputted by the Hall sensors and the shift signals over the way of displacement;

FIG. 21: a three-dimensional view of a further embodiment of a shift module according the invention;

FIG. 22: a three-dimensional partial view of an end of a slider with spring, wedge-element and roller; and FIG. 23: a three-dimensional partial sectional view of the shift module of FIG. 21 for illustration of the inner components of the slider in the rest position (a) and if the slider was moved to the left (b).

DESCRIPTION OF THE PREFERRED EMBODIMENTS

In the following the preferred embodiments are discussed in detail with reference to the drawings.

In FIG. 1 a shift module 1 is shown having a housing 60, a slider 10 and a housing lid 70. The shift module 1 is a relatively flat, compact part which can be mounted within a shift lever unit (not shown) of a motor vehicle. To this end the shift module 1 comprises mounting openings 68 in the housing 60, to be fixed within the shift lever unit by means of screws, rivets or the like.

The housing 60 is partially closed by means of a housing lid 70, to protect the inner components of shift module 1. For an easy assembly of the housing lid 70 at the housing 60, it is provided with clips 72, which engage corresponding projections 61 at the housing.

In FIG. 1 it is shown that the housing lid 70 leaves free an area over the slider 10, which comprises an actuation opening 16. Into this actuation opening 16 a projection 5 (see FIG. 22) of a shift lever 6 engages to linearly displace the slider 10 within a guiding slot 66. To minimize free play between the projection 5 of the shift lever 6 and the actuation opening 16 of the slider 10 an insert 100 of a softer plastic material is introduced into the actuation opening 16. The insert 100 equalizes production tolerances between shift module 1 and the shift lever 6 and prevents sounds by the transition between the automatic mode and the manual mode of the shift lever unit.

In FIG. 2 a shift module 1 is shown without the housing lid 70, to show the inner components of shift module 1. The slider 10 is linearly displaceably supported within a corresponding guiding slot 66 within housing 60. The slider 10 essentially comprises of an elongated prismatic part, at which a guiding face 12 is arranged. The guiding face 12 comprises a first partial face 13 and a second partial face 14 which are arranged one after the other at the slider 10 in displacement direction.

A tappet 30 as a resetting element is arranged within housing 60 perpendicularly to the slider 10 and biased against the guiding face 12 of the slider 10 by means of a spring 50. At the end of the tappet 30 a roller 32 is rotatably arranged, which can roll on the guiding face 12. The roller 32 decreases the friction between the slider 10 and the tappet 30. The tappet 30 acts together with the guiding face 12, such that the slider 10 after a displacement is reset to its rest position, which is shown in FIG. 2. This is described in more detail with reference to FIG. 3.

As a part of a measuring device 20, 92, 94 the slider 10 further comprises a magnet 20, which is mounted at the slider 10 and which projects to the bottom.

The shift module 1 further comprises a circuit board 90, which is mounted within housing 60. On the circuit board 90 two Hall sensors 92, 94 are arranged beside each other in parallel to the movement direction of slider 10. The Hall sensors 92, 94 are orientated on the circuit board 90, such that the permanent magnet 20 stimulates both Hall sensors essentially with the same force in the rest position of slider 10. In the shown embodiment the permanent magnet 20 is oriented central to the Hall sensors 92, 94.

In the following the function of shift module 1 is explained with reference to FIG. 3. FIG. 3a shows a condition in which the slider 10 is displaced to the right by means of a shift lever 6 for example to manually shift to a higher gear. FIG. 3b shows the position of slider 10 if the shift lever 6 is located in its rest position, respectively neutral position, or if the shift lever 6 does not engage slider 10 and is located in the automatic pathway. Finally, FIG. 3c shows a position in which the slider 10 is displaced to the left by means of the shift lever 6, for example to manually shift to a lower gear.

If slider 10 is displaced to the right, as it is shown in FIG. 3a, the essentially convex shaped partial face 13 of the guiding face 12 presses the tappet 30 to the bottom against the spring effect of spring 50, wherein the spring 50 is biased stronger. Simultaneously the permanent magnet 20 moves together with the slider 10 to the right, such that the magnet effect on the left Hall sensor 92 decreases and on the right Hall sensor 94 increases. Therefore, the right Hall sensor 94 measures a stronger magnet field than the left Hall sensor 92, which is now further away from the permanent magnet 20. In this condition the strength of the magnetic field at the right Hall sensor 94 is higher than in the rest position of slider 10. Then, the strength of the magnetic field at the left Hall sensor 92 is lower than in the rest position of slider 10.

In the condition shown in FIG. 3c the slider 10 is displaced to the left, wherein the partial face 14 of the guiding face 12 displaces the tappet 30 against the force of the spring 50 further to the bottom. Thereby, also the permanent magnet 20 is displaced to the left, wherein the left Hall sensor 92 is subjected to a stronger magnetic field than the right Hall sensor 94. In this condition the strength of the magnetic field at the left Hall sensor 92 is higher than in the rest position of the slider 10. The strength of the magnetic field at the right Hall sensor 94 than is lower than in the rest position of the slider 10.

The values of the Hall sensors 92 and 94, measured during the displacement of slider 10, are shown in diagram 120 of FIG. 20, in which the measuring values in mV are drawn over the way of displacement of slider 10. The curve 122 thereby corresponds to the measuring value of the left Hall sensor 92 and the curve 124 corresponds to the measuring value of the right Hall sensor 94.

One can see at the curve 122, that the measuring value of the left Hall sensor 92 decreases continuously from a maximum of approximately 1800 mV at a displacement of −5 mm (slider 10 displaced completely to the left) to approximately 200 mV at a displacement of +5 mm (slider 10 displaced completely to the right). At the rest position of the slider 10, i.e. at a displacement of 0 mm the Hall sensor 92 outputs approximately 1250 mV.

The measuring value of the right Hall sensor 94 increases from a minimum of approximately 200 mV at a displacement of −5 mm (slider 10 displaced completely to the left) continuously to approximately 1800 mV at a displacement of +5 mm (slider 10 displaced completely to the right). In the rest position of slider 10, i.e. at a displacement of 0 mm, the Hall sensor 92, like the Hall sensor 94, outputs approximately 1250 mV.

During a displacement of slider 10 out of its rest position (FIG. 3b) into a position according to the FIG. 3a or 3c a spring force of spring 50 has to be exceeded, which is transmitted via the guiding face 12 (partial faces 13, 14) to the tappet 30. According to the spring constant of spring 50 and the shape of the guiding face 12 a defined actuation force results over the way of displacement. The shape of the guiding face 12, respectively its partial faces 13, 14, can be chosen such that the user receives a haptic feedback during switching of the gears. In the shown convex shape of the partial faces 13, 14 the shift lever 6 has to be displaced out of the rest position by means of a comparably high force, wherein this force decreases after exceeding a maximum in direction to the end positions. Therefore, the driver can feel the shift process.

In FIG. 19 the curve 110 shows the desired force at the slider 10 over its slider way. A position of 0 mm corresponds to the rest position of slider 10. At a displacement to the left, in direction of −5 mm, the corresponding force at slider 10 is negatively drawn correspondingly to its direction. At a displacement to the right, in direction of +5 mm, the corresponding force at slider 10 is positively drawn correspondingly to its direction. The curves 112 show typical allowable tolerance areas around curve 110.

The diagram shows that initially at the first millimeters to the left (− direction) as well as to the right (+ direction) the force heavily increases until a maximum force of approximately ±80 N is reached at a way of displacement of approximately ±1, 2 mm. In the following the required force decreases to about ±60 N. In this embodiment the slider 10 has a way of displacement of ±5 mm around the rest position.

The force progression 110 relates as a result of the convex shape of the partial faces 13, 14 of the guiding face 12, the rise thereof is getting lower with increasing displacement. Simultaneously the pressure force which acts on the guiding face 12 via the tappet 30 decreases by means of the stronger compression of spring 50. To achieve the desired force progression 110 additionally friction effects and the diameter of roller 32 have to be taken into account for the calculation of the shape of guiding face 12.

If the shift lever 6 is released in one of its end positions, the force of the slider 10 is sufficient to set it back to its rest position. To this end the spring 50, the tappet 30 and the guiding face 12, respectively its partial faces 13, 14 are developed such that a sufficient resetting force is generated and no further resetting means are required.

Due to the desired force progression 110 the friction within the system should be possibly low. Therefore, the tappet 30 is provided with a roller 32 at the end facing the guiding face 12, as it can be seen in FIG. 7. The roller 32 comprises shafts 33, which can be clipped into bearings 35, which are open to the top, as it is shown in FIGS. 5 and 6.

As it is shown in FIG. 6, the tappet 30 comprises slightly extending guiding faces 31 at two opposite arranged sides, which extend in movement direction of tappet 30. By means of this stripe shaped design of the lateral sides 31 of the tappet 30 the friction of tappet 30 within guiding 62 is decreased.

In a similar way also roller 32 can be supported by means of extending guiding faces 34 at tappet 30.

For a further decrease of the friction of tappet 30 a metal guide 40 can be inserted into guiding 62. The metal guide 40 is essentially U-shaped, as it can be seen in FIG. 8, and preferably comprises two exactly parallel side walls 42. These are connected to each other by a bottom wall 44. The bottom wall 44 further acts as a support face for spring 50. The metal guide 40 is preferably produced of a powder metallic material, preferably of DIN SINT-D11, a high strength and high abrasion resistant iron-carbon-copper-alloy. By the provision of a metal guide 40 the friction at the tappet 30 can be minimized, whereby the shift feeling can be better adjusted.

As it can be seen in FIG. 9 the housing 60 comprises three pins 54 for the assembly of the circuit board 90, which perpendicularly extend to the top from the lateral wall of housing 60. As it is shown in FIGS. 10 and 11, the circuit board 90 comprises mounting openings 96 corresponding to the pins 64, such that the circuit board 90 can be put onto the pins 64. To support circuit board 90 play free and vibration protected within housing 60 O-rings 80 are put on each of the pins 64, which act as a damping means.

In FIG. 11 the kind of mounting of FIGS. 9 and 10 is magnified shown in detail. The O-rings 80 bear on mounting posts 65 which position the circuit board 90 away from the wall of the housing 60. The O-rings 80 press the circuit board 90 in mounted condition against the mounting bushings 74 of the housing lid 70. Since the O-rings 80 are pressed together during the assembly, tolerances of housings 60 and the housing lid 70 are equalized and the circuit board 90 is play fee supported also during heavy vibrations and therefore protected from damages. The mounting bushings 74 also position the circuit board 90 away from the wall of housing lid 70. Therefore the electric components on the circuit board 90, particularly the Hall sensors 92, 94 are protected from mechanical loads.

FIG. 12 shows the backside of housing 60 with the two mounting openings 68 and the projections 61.

In FIG. 13 the bottom side of the housing lid 70 is shown, wherein particularly the clips 72 and the mounting bushings 74 are shown. FIG. 14 shows the top side of the housing lid 70 with the clips 72. The housing lid 70 further comprises a plate shaped extension 76 to the top, which covers the backside of the slider 10 and protects the circuit board 90 from introducing dirt.

In FIGS. 15 to 17 the slider 10 is shown. In FIG. 15 the insert 100 is inserted into the receptacle 16 for the shift lever 6. The insert 100 is shown separately in FIG. 18 and consists of an essentially U-shaped part, the sidewalls thereof are bent away from each other in direction of the opening to facilitate the engagement with the shift lever 6. The insert 100 consists of a softer plastic material, as for example POM (polyoxymethylene), as described above, to allow a play free engagement of the shift lever 6 into the slider 10.

In FIGS. 15 to 17 the shape of the guiding face 12 is shown. The guiding face 12 consists of two partial faces 13, 14, which are essentially symmetrical to each other and which are convexly shaped in direction of the tappet 30, i.e. in the FIGS. 15 to 17 to the bottom, and which form a general V-shaped opening. The partial faces 13, 14 define a position in between each other, which corresponds to the rest position of slider 10. In the rest position of slider 10 the end of tappet 30, respectively the roller 32 is located at the deepest position of the V, i.e. exactly in between the partial faces 13, 14.

The partial faces 13, 14 are formed of two essentially triangular elements, which are integrally formed with the slider 10 and which extend essentially perpendicularly to the movement direction of the slider 10. The guiding face 12 comprises an effective width b, which is slightly larger than the maximum way of displacement of the slider 10. Thereby it is secured, that the end of the tappet 30, respectively the roller 32, always presses against the inclined partial face 13, 14 of guiding face 12 and therefore actuates a sufficiently high resetting force to the slider 10 over the complete way of displacement. The attack angle of the convexly shaped faces 13, 14 is chosen such that tappet 30 resets the slider 10 such that also the shift lever 6 connected thereon is reset to its rest position. In the shown embodiment the attack angle is approximately 45°.

FIGS. 17 and 21 furthermore show a permanent magnet 20 which is connected to the slider 10, 200 by means of overmolding. In the shown embodiments the permanent magnet 20 comprises an essentially flat rectangular shape. However, it could also be round or arbitrarly shaped, just the arrangement of the Hall sensors 92, 94 should be adjusted to the shape of the permanent magnet 20. The permanent magnet 20 is essentially a neodymium magnet having a high force of the magnetic field. By this means the shift module 1 is insensitive with respect to magnet fields which are introduced from the outside and which are in general weaker.

As already described, the resulting voltages of the Hall sensors 92 and 94 are shown in the diagram 120 of FIG. 20. Each position of the slider 10, 200 is designated to a definite voltage value of the Hall sensors 92 (curve 122) and designated to a definite voltage value of Hall sensor 94 (curve 124). Therefore, with these two voltage values the exact position of slider 10, 200 can be exactly measured.

The values measured from the Hall sensors 92, 94 are processed by a shift electronics, which is located on the circuit board 90 or which can be arranged outside of shift module 1. The shift electronics periodically controls the voltage values of the Hall sensors 92, 94 and compares them with said thresholds, at which a shift signal is output to the gear drive (not shown).

These digital shift signals are exemplary shown in the lower diagrams 130 and 132 of FIG. 20. The shift signal 130 is for example a signal to the gear drive to set a lower gear, the shift signal 132 is for example a signal for a higher gear. The thresholds can be arbitrarily set, such that the shift position of slider 10, 200, which is required to trigger a shift signal 130, 132 can be arbitrarily set.

In the shown example for the shifting back a shift position 126 of −2.0 mm is set and for the shifting up a shift position 128 of for example +3.3 mm is set. This means, that the signal 130 to shift one gear down takes a high voltage respectively a logic 1 after a displacement of −2 mm, wherein the signal is a logic 0 from 5 to −2 mm. The signal 132 takes a high voltage respectively a logic 1 after a displacement of +3.3 mm to shift a gear up, wherein from −5 to +3.3 mm it is a logic 0.

In the shown embodiment the shift electronics sets signal 130 to the value 1, if the left Hall sensor 92 measures a voltage 122 of 1700 mV or more (see curve 122 in FIG. 20). Alternatively the shift electronics could set the signal 130 to the value 1 if the right Hall sensor 94 measures a voltage 124 of less than 700 mV.

This is correspondingly appropriate for signal 132. The shift electronics sets the signal 132 to the value 1, if the right Hall sensor 94 measures a voltage 124 of 1800 mV or more (see curve 124 in FIG. 20). Alternatively, the shift electronics could set the signal 132 to the value 1, if the left Hall sensor 92 measures a voltage 122 of less than 300 mV.

From these considerations it will be clear, that it is in general sufficient to use only one Hall sensor, either 92 or 94 to determine the exact position of the slider 10, 200. Although, for safety reasons preferably two Hall sensors 92, 94 are used to generate redundancy. The system then is less susceptible for magnet fields which introduce from the outside.

The above shown measuring method can be modified thereby that the curves 122 and 124 are stored within the switch electronics and initially the actual position of the slider 10, 200 is measured from the voltages of the Hall sensors 92, 94. This position is then compared with the desired switch positions, which are also stored within the switch electronics. During the under running or exceeding of these switch positions then a corresponding signal 130 respectively 132 is output to the gear drive. The communication with the gear drive and other components of the vehicle preferably is done via a data base.

The shift electronics, which preferably comprises an 8 Bit microcontroller can also be adapted such that from the positioning changes the velocity of the slider 10, 200 and therefore the velocity of the shift lever 6 can be measured, respectively calculated. Out of the velocity by means of which the driver actuates the shift lever 6 information can be derived, which can be used for an optimum control of the gear drive or the motor. So, the switch velocity can give important hints at which traffic situation the driver is (starting, accelerating, passing by, rolling out in front of a traffic light, etc.).

The FIGS. 21-23 show a further embodiment of the shift module 1. The electric components, like the circuit board 90 and the Hall-sensors 92, 94, as well as the shift electronics and their corresponding functions correspond to the already described embodiments.

The embodiment of the FIGS. 21-23 differs in the design of the slider 200 and the resetting elements 230, 232. Here, two rollers 230, 232 are supported as resetting elements within the slider 200 and perpendicularly to the direction of movement of the slider 200. The rollers 230, 232 are urged to the top in FIG. 23 by means of a common spring 240, which is preferably provided as a spiral spring, via two wedge elements 220, 222. FIG. 22 shows in detail, how the spring 240 acts upon the wedge element 222 and how the roller 232 is pushed to the top due to the wedge effect.

The rollers 220, 222 are thereby biased against two particularly shaped guiding faces 212, 214, which are formed into the housing 60. As is can be well seen in FIG. 23*a*) the guiding faces 212, 214 comprise an essentially rounded triangular shape with two faces 215, 216, correspondingly, which are sloped with respect to the slider 200. By means of these faces the rollers 220, 222 are pressed into the slider 200, i.e. to the bottom in FIG. 23, during a displacement of the slider 200 out of the rest position. Thereby, the wedge element 220 is pushed to the right with respect to the slider 200 and wedge element 222 to the left. Simultaneously the spring 240 is compressed.

If the slider 200 is released in a displaced position (as for example the position according FIG. 23 *b*)) by releasing the shift lever 6, the spring 240 presses the slider 200 back to the rest position via the wedge element 222 and the roller 232. Thereby, the rollers 230, 232 move upwards along the guiding faces 212, 214.

The force progression of the shift module 1 is determined by the shape of the guiding faces 212, 214, the size of the rollers 230, 232, the shape of the wedge elements 220, 222, the strength of the spring 240 and the used materials and is shown in FIG. 19 as an example.

The rollers 230, 232 and the guiding faces 212, 214 act on the one hand to reset the slider 200 an the shift lever 6 and on the other hand they simultaneously act for the definition of a desired force progression, in order to provide a haptic feedback of the shifting action to the user. As described, only one spring 50, 240 is advantageously required to realize both functions, like also in the embodiment according FIGS. 1-8.

The housing 60, the housing lid 70 and the sliders 10, 200 preferably comprise of a fibre glass reinforced plastic material, particularly preferred PA 6.6+30GF+2% $MoS_2$. By the addition of $MoS_2$ the plastic material becomes self lubricating, such that it provides excellent glide properties which only require a minimum of lubricants. The insert 100, the tappet 30 and the wedge elements 220, 222 preferably comprise of POM (polyoxymethylene). The rollers 32, 230, 232 comprises of a steel F 2114 and preferably have a diameter of 6 mm. The springs 50 and 240 preferably comprise of a spring steel wire according to DIN 17223 CAL.C. The O-rings preferably comprise of NBR (butadiene-acrylnitril-rubber). The magnet 20 preferably is a neodymium magnet having the dimensions 7×7×2.5 mm. The metal guide 40 comprises of a powder metallic material, particularly preferred DIN SINT-D11.

LIST OF REFERENCE SIGNS

| | |
|---|---|
| 1 | Shift module |
| 5 | Projection |
| 10 | Slider |
| 12 | Guiding face |
| 13 | First partial face |
| 14 | Second partial face |
| 16 | Actuation opening |
| 20 | Permanent magnet |
| 30 | Resetting element, Tappet |
| 31 | Guiding faces |
| 32 | Roller |
| 33 | Shafts |
| 34 | Guiding faces |
| 35 | Bearings |
| 40 | Metal guide |
| 42 | Side walls |
| 44 | Bottom wall |
| 50 | Spring |
| 60 | Housing |
| 61 | Projections |
| 62 | Guiding |
| 64 | Pins |
| 65 | Mounting posts |
| 66 | Guiding slot |
| 68 | Mounting openings |
| 70 | Housing lid |
| 72 | Clips |
| 74 | Mounting bushings |
| 76 | Plate-shaped extension |
| 80 | O-rings |
| 90 | Circuit board |
| 92 | Left Hall sensor |
| 94 | Right Hall sensor |
| 96 | Mounting openings |
| 100 | Insert |
| 110 | Curve of force progression |
| 112 | Curve of tolerance area |
| 120 | Voltage displacement diagram |
| 122 | Curve of left Hall sensor |
| 124 | Curve of right Hall sensor |
| 126 | Lower switch position |
| 128 | Upper switch position |
| 130 | Signal diagram for shifting down |
| 132 | Signal diagram for shifting up |
| 200 | Slider |
| 212, 214 | Guiding faces |
| 215, 216 | Sloped faces |
| 220, 222 | Wedge elements |
| 230, 232 | Resetting elements, Rollers |
| 240 | Spring |

The invention claimed is:

1. Shift module (1) for a shift lever of an automatic gear drive, comprising:
   a. a linearly displaceably supported slider (10), which is engageable with the shift lever and which can be displaced linearly within a stationary guiding slot from a rest position to a displaced position, the slider being constrained by the guiding slot to move linearly in two opposite switching directions by means of the shift lever;
   b. a measuring device (20, 92, 94) that determines the position of the slider (10), the measuring device (20, 92, 94) comprising a permanent magnet (20) mounted to the slider (10, 200), the permanent magnet (20) cooperating with at least one stationary Hall sensor (92, 94), such that the measuring device (20, 92, 94) measures the actual position of the slider (10) continuously in space over substantially the full travel of the slider;
   c. shift electronics which output a digital shift signal to the automatic gear drive at particular values measured by the Hall sensors (92, 94) wherein the shift electronics are further arranged such that the velocity of the slider (10) and thereby the velocity of the shift lever are calculated; and
   d. at least one resetting element (30) that applies a resetting force to the slider (10), urging the slider toward the rest position, the resetting element (30) being biased against a guiding face (12) formed on the slider, the guiding face (12) comprising two opposing partial faces (13, 14) which are spaced apart and substantially symmetrical to each other, each of the two opposing partial faces being convex in shape continuously over the portion of the guiding face that comes into contact with the resetting element and each of the two opposing partial faces being inclined with respect to the movement direction of the slider (10) such that the shift lever is displaced out of the rest position by means of a initially higher force (110), which decreases after a predetermined displacement of the slider, the guiding face (12) of the slider (10) further comprising an effective width (b), which is larger than the full travel of the slider;

e. the resetting force alone being sufficient to move the slider (10) and the shift lever from said displaced position back to the rest position.

2. Shift module according to claim 1, wherein the resetting force is applied to the slider (10) over the full travel of the slider in a direction toward the rest position.

3. Shift module (1) for a shift lever of an automatic gear drive, comprising:
   a. a linearly displaceably supported slider (10, 200), which is engageable with the shift lever and which can be displaced linearly within a stationary guiding slot from a rest position to a displaced position, the slider being constrained by the guiding slot to move linearly in two opposite switching directions by means of the shift lever;
   b. a measuring device (20, 92, 94), which interacts with the slider (10, 200), for detecting the shift positions of slider (10, 200); and
   c. at least one resetting element (30, 230, 232) that is displaceably supported substantially perpendicularly to the movement direction of the slider (10, 200), the resetting element being in direct contact with the slider and applying a resetting force to the slider (10, 200) and being biased against a guiding face, the guiding face comprising two opposing partial faces (13, 14, 212, 214) each of the two opposing partial faces being convex in shape continuously over the portion of the guiding face that comes into contact with the resetting element and each of the two opposing partial faces being inclined with respect to the movement direction of the slider (10, 200), the resetting element (30, 230, 232) applying a resetting force having an initially higher magnitude that reaches a maximum then decreases with displacement of the shift lever from the rest position, wherein the resetting element is in direct contact with the slider (10, 200) over the full travel of the slider, the resetting force alone being sufficient to move the slider (10, 200) and the shift lever from the displaced position back to the rest position.

4. Shift module according to claim 3, wherein the resetting element (30, 230, 232) comprises a spring-biased tappet (30) supported in a housing (60), wherein the guiding face (12) has a width (b) that is larger than the full travel of the slider (10).

5. Shift module according to claim 4, wherein the tappet (30) comprises a rotatably supported roller (32) that faces the slider (10).

6. Shift module according to claim 4, wherein the tappet (30) is supported within a metal guide (40), produced of a powder metallic material.

7. Shift module according to claim 3, further comprising a housing (60) and a circuit board (90), which is mounted within the housing (60) by means of O-rings (80) that are compressed between the housing (60) and the circuit board (90).

8. Shift module according to claim 3, wherein the measuring device (20, 92, 94) comprises a permanent magnet (20) that is mounted to the slider (10, 200) and which cooperates with two stationary Hall sensors (92, 94).

9. Shift module according to claim 8, wherein both Hall sensors (92, 94) are substantially equidistant from the permanent magnet (20) with the slider (10, 200) in the rest position such that both Hall sensors (92, 94) are stimulated by means of the permanent magnet (20) with substantially the same force.

10. Shift module according to claim 8 further comprising shift electronics which output a digital shift signal to the automatic gear drive at particular values measured by the Hall sensors (92, 94).

11. Shift module according to claim 10, wherein the shift electronics are adjustable to provide a plurality of digital shift signals at a plurality of desired shifting positions of the slider (10, 200).

12. Shift module according to claim 10, wherein the shift electronics are arranged such that the velocity of the slider (10, 200) and thereby the velocity of the shift lever are calculated from the measured position changes.

13. Shift module (1) for a shift lever of an automatic gear drive, comprising:
   a. a linearly displaceably supported slider (200), which is engageable with a shift lever and which can be displaced linearly within a stationary guiding slot from a rest position, the slider being constrained by the guiding slot to move linearly in two opposite shift directions by means of the shift lever;
   b. a measuring device (92, 94), which interacts with the slider (200), for detecting the shift positions of slider (200); and
   c. at least one resetting element (230, 232), comprising two spring-biased rollers (230, 232), which are supported in the slider (200) and are displaceable substantially perpendicular to the movement direction of the slider (200), each of the spring-biased rollers (230, 232) being biased against one of two opposing partial faces (212, 214) collectively forming portions of a guiding face, the two opposing partial faces (212, 214) being spaced-apart and convex in shape continuously over the portions of the partial faces (212, 214) that come into contact with the resetting elements, and each of the partial faces being inclined with respect to the movement direction of the slider (200), the resetting element (30, 230, 232) applying a resetting force having an initially higher magnitude that reaches a maximum then decreases with displacement of the shift lever from the rest position, wherein the resetting force acts on the slider (200) over the full travel of the slider in a direction toward the rest position and is alone sufficient to move the slider (200) and the shift lever from the displaced position back to the rest position.

14. Shift module according claim 13, wherein the guiding face (212, 214) is formed into a housing (60) of the shift module (1).

15. Shift module according to claim 13, wherein the spring-biased roller (230, 232) comprises a spring (240) acting on a wedge element (220, 222).

* * * * *